March 15, 1949.   H. J. MODREY   2,464,543
CLUTCH OR COUPLING DEVICE

Filed Sept. 21, 1944   2 Sheets-Sheet 1

Inventor:
Henry John Modrey,
By
Pierce & Scheffler,
Attorneys.

March 15, 1949.  H. J. MODREY  2,464,543
CLUTCH OR COUPLING DEVICE

Filed Sept. 21, 1944  2 Sheets—Sheet 2

Inventor:
Henry John Modrey,
By Pierce & Scheffler,
Attorneys.

Patented Mar. 15, 1949

2,464,543

UNITED STATES PATENT OFFICE 2,464,543

CLUTCH OR COUPLING DEVICE

Henry John Modrey, London, England, assignor to Modrey Patents Corporation, county of Essex, N. J., a corporation of New Jersey Application September 21, 1944, Serial No. 555,189
In Great Britain September 24, 1943

5 Claims. (Cl. 287—20.5)

This invention relates to clutches and coupling devices.

There are known generally as locating pins devices by means of which the holes in superimposed plates are located and the plates temporarily locked together. These devices consist in general of a clamping rod having a clamping head which fits and can be passed through registering holes in the plates to be locked together and then displaced laterally and locked by a wedging device so that the plates are held together in their correct relationship.

The object of the present invention is to apply this general clamping principle in such a way as to render it applicable to a variety of uses which vary from shaft couplings usable as clutches for purposes of power transmission, automatic train couplings down to smaller coupling devices such as chain and cable couplings, and even safety catches for necklaces.

The invention may be said to consist broadly of a mechanical coupling comprising a male or engaging member having a spring controlled clamping rod adapted to be projected against the influence of the controlling spring through a hole in a female or engaging member and thereafter to be automatically locked in engagement with said female member by a wedging stud.

In the preferred construction the arrangement is such that the male or engaging member of the coupling has an enlarged clamping head of substantially the same size and shape as the hole in the female or receiving member, the clamping rod itself being of lesser cross section than the clamping head at least immediately beyond the head, and a wedging stud relative to and in contact with which the clamping rod is slidable, said wedging stud in its operative position being of such cross section as together with the clamping rod substantially to fill the hole in the female member after the enlarged head of the clamping rod has been passed through the hole in the female member and displaced into locking engagement with the female member.

Examples of the practical application of the invention are diagrammatically illustrated in the accompanying drawings, wherein.

Figures 7, 8:
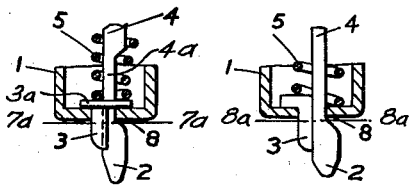
Figures 7 and 8 are still other modifications of the engaging member.
Figure 7A:
Figure 8A:
Figure 9:
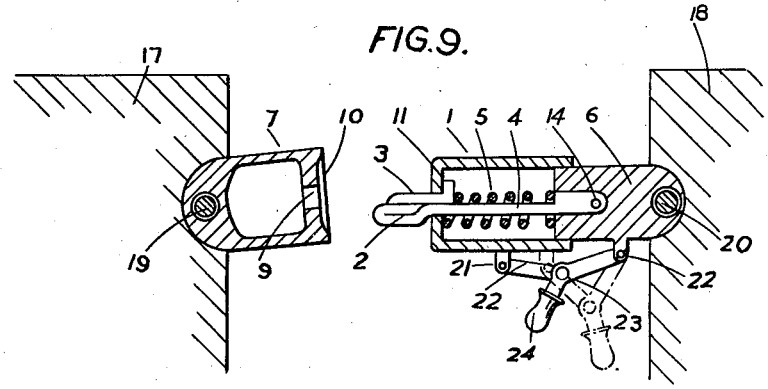
Figure 10:
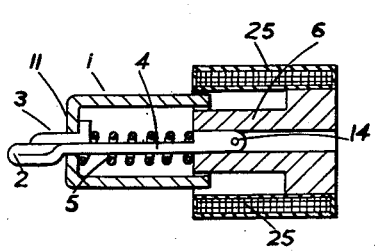
Figure 11:
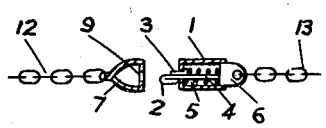

Figures 7a and 8a respectively are sections along lines 7a—7A and 8a—8a of Figures 7 and 8 respectively;

Figure 9 shows in longitudinal section the members of the coupling applied to the purpose of a vehicle coupling;

Figure 10 shows in longitudinal section how the male member of the coupling can be arranged for direct electrical operation; and Figure 11 shows the coupling applied as a safety catch for a necklace, bracelet, watch chain or the like.

Figure 1:
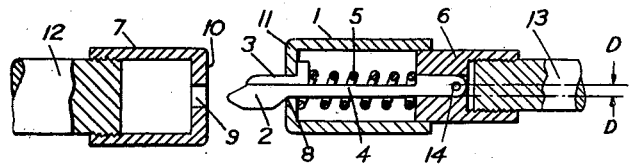
Figure 1 is a longitudinal section of the disconnected male and female members of a coupling according to the invention.
Figure 2:
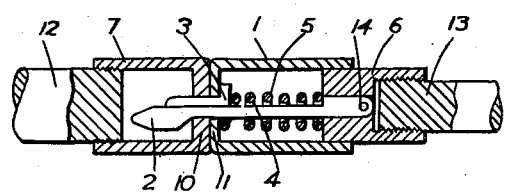
Figure 2 is a similar view showing the two members in their coupled relation.

Referring to these drawings and particularly to Figures 1 and 2, the numeral 1 designates the casing of the male or engaging member of the coupling. This casing is closed at its forward end by a wall member 11 having therethrough an opening 8. Within this casing 1 a slidable clamping rod 4 is arranged having an enlarged clamping head 2 projecting beyond the end of the casing 1. The end of this clamping rod 4 remote from the clamping head 2 is anchored by means of a bolt 14 to a piston device 6 to which is coupled by a screw or other suitable means a shaft or other element 13 to be coupled to a second shaft or element 12 attached to the female or receiving member 7 of the coupling device. This female member is hollow and provided with an opening 9 in its end wall. The numeral 3 designates the wedging stud or slide of the clamping device which is of such cross section that together with the clamping rod 4 the hole 8 in the wall member 11 of the casing 1 is substantially filled. As will be noted the tip of the clamping head is extended beyond the tip of the wedging stud when the coupling members are separated. The largest cross-section of the clamping head is so selected that it substantially fills hole 9 as also does the joint cross-section of rod 4 and wedging stud 3. This clamping rod and wedging stud are held in relative position by means of the compression spring 5, one end of which presses on the inner end of the wedging stud and the other engages a shoulder at the end of the clamping rod 4 remote from the clamping head 2.

Figure 6:
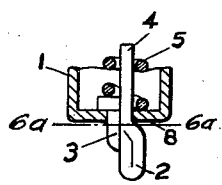
Figure 6 is an elevational side view of a modification of the engaging member of the coupling.
Figure 6B:
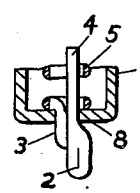
Figure 6b is another modification of the engaging member.
Figure 6A:
Figure 6a is a section along line 6a—6a of Figure 6.

The precise construction and arrangement of the clamping rod 4 and wedging stud 3 may vary, since their cross-sections are complementary in function as will be seen from a consideration of Figures 6, 7 and 8. In Figures 6 and 6a the body 4 of the clamping rod is preferably semi-circular in cross section and the cross section of the wedging stud 3 is similar but the respective sections of these parts may vary so long as they conjointly substantially fill the hole 8 in the casing 1 and the two parts can slide relatively to each other. The enlarged clamping head 2 of the clamping rod 4 may be formed in a simple and effective manner by bending up and doubling over the end of a D-sectioned rod so as to form a circular section as illustrated. Figure 6b differs from Figure 6 only in that the wedging stud 3 is an integral extension from the spring 5 which in this case is semi-circular in cross section so as to be complementary to the particular cross section of the clamping rod. In Figures 7 and 7a the clamping rod 4 is circular in cross section but is cut away for a suitable distance at 4a and the wedging stud 3 proceeds from a slotted plate 3a upon which the compression spring 5 bears, and the necessary complementary cross section of the combined parts making up the (in this instance) circular shape to fill the hole 8 is indicated by the section of Figure 7a. Figures 8 and 8a show how the circular section may be replaced by a rectangular section in which case, of course, the hole 8 in the casing 1 will be correspondingly rectangular. Wherever cross-sections are referred to, the reference is to the operating parts of clamping rod and wedging stud only.

Referring back to Figures 1 and 2 the operation of the coupling whatever be the precise form in detail is the same in all cases and is as follows:

When it is desired to effect the coupling pressure is applied to the piston 6 against the influence of the spring 5 and thus the enlarged clamping head 2 of the clamping rod 4 is projected beyond the tail of the wedging stud 3. The enlarged head 2 is then passed through the hole 9 in the female member of the coupling (the shape and size of which corresponds substantially to the joint cross section through clamping rod and wedging stud) and is displaced laterally by the action of the wedging stud 3 entering the hole. When the pressure applied to the piston 6 is released the spring 5 slightly withdraws and then maintains the enlarged clamping head 2 of the clamping rod in firm engagement with the inner face of the wall of the end of the female member as shown in Figure 2.

When it is desired to join elements 12 and 13 by automatic coupling, the protruding tip of clamping head 2 is inserted into opening 9 and the male and female member are pressed one against the other. Then, the face 10 of female member 7 will press wedging stud 3 into casing 1 until clamping head 2 will reach the position of Figure 2, whereupon wedging stud 3 will automatically snap into its latching position.

A coupling such as shown in Figures 1 and 2 is admirably suited to the coupling together of shafts or ropes.

Figure 3:
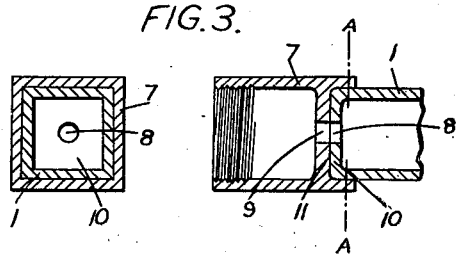
Figure 3 illustrates how the coupling members may be of angular form so as to provide conveniently for the transmission of torsional or rotative force applied to one member of the coupling being transmitted to the other.

A further method of providing for power transmission is shown in Figure 3. In this case the male and female members are made of rectangular shape and the end of the female member is formed with a recessed end into which the end of the male member fits.

Figure 4:
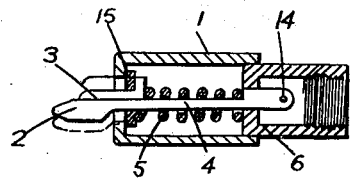
Figures 4 and 5 show modified constructions of the male member of the coupling.

If desirable, as shown in Figure 4, the wedging stud 3 and the clamping rod 4 may pass through a hole in a floating washer 15 inside the casing 1, the hole in the end of the casing 1 being made large enough to permit a floating movement of the clamping members.

Figure 5:
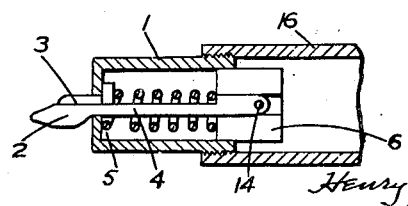

Figure 5 shows an arrangement of safety link whereby the coupling will part when a predetermined tension, dependent on the strength of the spring 5, is reached. If a pulling force is applied to the sleeve 16 attached, for example by screwing, to the casing 1 the two members of the coupling will part as soon as the pull is sufficient to withdraw the wedging stud 3 from the hole in the female member.

Figure 9 shows the application of the invention to a vehicle coupling, the female member being pivotally attached at 19 to the end of the vehicle 17, and the male member pivotally attached at 20 to the next vehicle, the operation of the device being effected by mechanical actuating means such as the lever handle 24 of the toggle mechanism pivoted to lugs 21 and 22 on the casing 1 and piston device 6 respectively.

Figure 10 shows how electrical actuating means such as a solenoid coil 25 may be used to effect de-coupling without the assistance of the auxiliary mechanisms hereinbefore described, by the solenoid coil exerting a pull on the ferrous housing 1, which acts as the core of the solenoid, thus withdrawing the wedging stud 3 and permitting the enlarged clamping head of the clamping rod to pass out through the hole in the female member of the coupling.

Figure 11 shows the application of the invention to a safety clasp for a necklace or the like, the male member being attached to one end of the necklace and the female member to the other.

It will be observed that although pulling upon the chain will be ineffective to cause disconnection of the coupling parts, the disconnection can be easily effected when desired, by pulling upon the casing 1 as is the case with other forms of the coupling.

One particular advantage of the coupling is that disconnection can be effected under tension. That is to say, it is not necessary to first bring the two parts closer together to effect disconnection. This is of particular importance in the case of haulage ropes when de-coupling has to be effected in emergencies, when the ropes are under extreme tension.

What is claimed is:

1. A mechanical coupling comprising an engaging coupling member and a receiving coupling member for detachably connecting two elements, the receiving member including a wall member having an opening therein; the engaging member including a casing closed on one end by a wall member having an opening therethrough positioned to be in substantial alignment with the opening in the wall member of the receiving member when the coupling members are latched together, a clamping rod extended slidably through the opening of the casing wall member and having a clamping head outside the said wall member, means on the clamping rod for attaching one of the said elements to the clamping rod, the other element being associated with the receiving coupling member, said clamping head having a cross-section adapted to substantially fill the opening of the wall member of the receiving member, spring means on the engaging member arranged and positioned to bias the casing wall member and the clamping head toward a position relative to each other in which the clamping head is seated against the exterior of said casing wall member, a wedging slide retractable by said casing wall member and disposed slidably in the casing wall member opening, said wedging slide being biased by the spring means to extend through the casing wall member opening alongside the clamping rod and the clamping head, whereby, after a projection of the clamping head beyond the aforesaid position against the exterior of the casing wall member, compression of the spring means and passage of the clamping head and of the wedging slide through the wall member opening of the receiving member, the spring-biased wedging slide, upon release of the said compression of the spring means, prevents a withdrawal of the clamping head through the said wall member opening of the receiving member, thereby latching the two coupling members together.

2. A mechanical coupling as described in claim 1, wherein the clamping rod portion adjacent to the wedging slide and the wedging slide each have a rectangularly shaped cross-section and are positioned relative to each other to form a substantially rectangular joint cross-section, and wherein said joint cross-section is adapted to substantially fill a correspondingly shaped wall member opening of the receiving member.

3. A mechanical coupling as described in claim 1, in combination with a plunger slidably fitted in said casing, said plunger supporting one of said two elements and the clamping rod at the end thereof opposite to the clamping head, said spring means being disposed within the casing between the casing wall member and the plunger to bias the casing wall member and the clamping head toward the position relative to each other in which the clamping head is seated against the exterior of the said casing wall member.

4. A mechanical coupling as described in claim 1, in combination with linkage means operatively connected with said wedging slide and a point fixed relative to the wedging slide for withdrawing the wedging slide relative to the clamping head against the action of said spring means, thereby retracting the wedging slide from its wedging position and releasing the latched coupling members.

5. A mechanical coupling device as described in claim 1, wherein said receiving coupling member comprises a casing closed on one end by the said wall member including the opening, the said wall member being positioned and arranged to form a cup portion at the receiving end of the receiving member casing, and wherein the center point of the opening in the wall member closing one end of the casing of the engaging member is positioned symmetrically relative to the outline of the said latter wall member and also to the side wall of the casing of the engaging member, said cup portion of the receiving member being adapted to receive therein the closed end of the casing of the engaging member when the coupling members are latched together.

HENRY JOHN MODREY.

REFERENCES CITED

UNITED STATES PATENTS

The following references are of record in the file of this patent:

| Number | Name | Date |
| --- | --- | --- |
| 114,616 | Snell | May 9, 1871 |
| 459,994 | Cloud | Sept. 22, 1891 |
| 463,513 | Hoss | Nov. 17, 1891 |
| 526,448 | Karschner | Sept. 25, 1894 |
| 575,748 | Williamson | Jan. 26, 1897 |
| 736,371 | Egbert | Aug. 18, 1903 |
| 1,410,770 | Silverman et al. | Mar. 28, 1922 |
| 1,446,430 | Orchowski | Feb. 20, 1923 |
| 1,918,583 | Bear | July 18, 1933 |
| 1,953,063 | Coultas | Apr. 3, 1934 |
| 2,051,591 | Brogan | Aug. 18, 1936 |
| 2,136,875 | Blanc | Nov. 15, 1938 |
| 2,175,318 | Rosenberry | Oct. 10, 1939 |
| 2,187,929 | Blanc | Jan. 23, 1940 |
| 2,221,371 | De Bethune | Nov. 12, 1940 |
| 2,234,938 | Degener | Mar. 11, 1941 |
| 2,248,882 | Lear | July 8, 1941 |
| 2,266,643 | Kruse | Dec. 16, 1941 |
| 2,280,403 | Finkle | Apr. 21, 1942 |
| 2,322,852 | Kost | June 29, 1943 |
| 2,329,601 | Frye | Sept. 14, 1943 |

FOREIGN PATENTS

| Number | Country | Date |
| --- | --- | --- |
| 553,623 | Great Britain | May 28, 1943 |